(12) United States Patent
Yu et al.

(10) Patent No.: US 8,927,134 B2
(45) Date of Patent: Jan. 6, 2015

(54) SEPARATOR HAVING POROUS COATING LAYER AND ELECTROCHEMICAL DEVICE HAVING THE SAME

(75) Inventors: Hyung-Kyun Yu, Daejeon (KR); Jong-Hun Kim, Daejeon (KR); Jang-Hyuk Hong, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/634,951

(22) Filed: Sep. 14, 2012

(65) Prior Publication Data

US 2013/0149587 A1 Jun. 13, 2013

Related U.S. Application Data

(63) Continuation of application No. PCT/KR2012/003503, filed on May 3, 2012.

(30) Foreign Application Priority Data

May 3, 2011 (KR) .................. 10-2011-0042014

(51) Int. Cl.
*H01M 2/16* (2006.01)
*H01M 2/14* (2006.01)
*H01M 10/052* (2010.01)

(52) U.S. Cl.
CPC ............ *H01M 2/1633* (2013.01); *H01M 2/145* (2013.01); *H01M 2/1653* (2013.01); *H01M 2/166* (2013.01); *H01M 2/1686* (2013.01); *H01M 10/052* (2013.01)
USPC .......................................... 429/144; 429/247

(58) Field of Classification Search
None
See application file for complete search history.

(56) References Cited

U.S. PATENT DOCUMENTS

| | | | |
|---|---|---|---|
| 5,093,197 A | 3/1992 | Howard et al. | |
| 2006/0246355 A1 | 11/2006 | Min et al. | |
| 2008/0113259 A1* | 5/2008 | Brilmyer et al. | 429/50 |
| 2008/0292968 A1* | 11/2008 | Lee et al. | 429/247 |
| 2009/0111025 A1 | 4/2009 | Lee et al. | |
| 2009/0291360 A1 | 11/2009 | Kim et al. | |
| 2011/0003209 A1* | 1/2011 | Katayama et al. | 429/246 |
| 2011/0052987 A1* | 3/2011 | Katayama et al. | 429/221 |
| 2011/0212357 A1 | 9/2011 | Umehara | |

FOREIGN PATENT DOCUMENTS

| | | |
|---|---|---|
| JP | 2-84507 A | 3/1990 |
| JP | 2008521964 A | 6/2008 |
| JP | 2008-524824 A | 7/2008 |
| JP | 2009-231281 A | 10/2009 |
| JP | 2010123383 A | 6/2010 |
| JP | 2010157521 A | 7/2010 |
| KR | 20060112730 A | 11/2006 |
| WO | 2004-049471 A2 | 6/2004 |
| WO | 2005-038959 A1 | 4/2005 |
| WO | 2009044741 A1 | 4/2009 |
| WO | 2010-052786 A1 | 5/2010 |

* cited by examiner

*Primary Examiner* — Patrick Ryan
*Assistant Examiner* — Haixia Zhang
(74) *Attorney, Agent, or Firm* — Lerner, David, Littenberg, Krumholz & Mentlik, LLP

(57) ABSTRACT

The present invention relates to a separator comprising a porous substrate; and a porous coating layer formed on at least one surface of the porous substrate and comprising a mixture of first inorganic particles coated with a coupling agent on the surface thereof, second inorganic particles coated with a coupling agent on the surface thereof and a binder polymer, the first inorganic particles having an average diameter of 1 to 10 μm and the second inorganic particles having an average diameter of 50 to 500 nm. In accordance with the present invention, a separator having a porous coating layer comprising two kinds of inorganic particles which are coated with a coupling agent is manufactured to minimize a mechanochemical reaction, thereby inhibiting the production of unnecessary substances, and to easily introduce functional particles.

13 Claims, No Drawings

SEPARATOR HAVING POROUS COATING LAYER AND ELECTROCHEMICAL DEVICE HAVING THE SAME

CROSS-REFERENCE TO RELATED APPLICATION(S)

This application is a continuation of International Application No. PCT/KR2012/003503 filed on May 3, 2012, which claims priority to Korean Patent Application No. 10-2011-0042014 filed in the Republic of Korea on May 3, 2011, the disclosures of which are incorporated herein by reference.

TECHNICAL FIELD

The present invention relates to a separator for an electrochemical device and an electrochemical device having the same. More particularly, the present invention relates to a separator in which a porous coating layer comprising a mixture of inorganic particles having different sizes and a binder polymer is formed on at least one surface of a porous substrate, and an electrochemical device having the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause electrical short between a cathode and an anode.

In order to solve the above safety problems of electrochemical devices, attempts have been made to use a heat-resistant non-woven fabric made of a fiber having a melting or decomposition point higher than that of polyolefin without excessive thermal contraction as a separator. Meanwhile, a separator comprising a highly porous substrate and a porous organic/inorganic coating layer formed on at least one surface of the porous substrate wherein the porous coating layer is formed by coating with a mixture of an excess of inorganic particles and a binder polymer has been proposed. The porous organic/inorganic coating layer contains inorganic particles having superior heat resistance, which prevents short circuits between a cathode and an anode even when an electrochemical device is overheated. Such a porous organic/inorganic coating layer may be formed by pulverizing inorganic particles by means of a high-energy milling process, mixing the pulverized inorganic particles with a binder polymer to obtain a slurry, and coating the slurry obtained on a porous substrate. However, the high-energy milling process for pulverizing inorganic particles may cause a mechanochemical reaction in which the pulverized inorganic particles react with air or other raw materials to produce unnecessary substances. The mechanochemical reaction should be controlled. In particular, in the case functional particles are introduced in the porous organic/inorganic coating layer to control such a side reaction in an electrochemical device, this may cause an additional mechanochemical reaction by the new raw materials.

DISCLOSURE

Technical Problem

The present invention is designed to solve the problems of the prior art, and therefore it is an object of the present invention to provide a separator comprising a porous coating layer capable of minimizing a mechanochemical reaction to inhibit the production of unnecessary substances.

It is another object of the present invention to provide a method for manufacturing the separator.

It is still another object of the present invention to provide an electrochemical device comprising the separator.

Technical Solution

In accordance with one aspect of the present invention, there is provided a separator comprising a porous substrate; and a porous coating layer formed on at least one surface of the porous substrate and comprising a mixture of first inorganic particles coated with a coupling agent on the surface thereof, second inorganic particles coated with a coupling agent on the surface thereof and a binder polymer, the first inorganic particles having an average diameter of 1 to 10 µm and the second inorganic particles having an average diameter of 50 to 500 nm. The weight ratio of the first inorganic particles:the second first inorganic particles preferably ranges from 50:50 to 90:10.

The porous coating layer may further comprise functional particles. Examples of the functional particles may include, but are not limited to, a water scavenger, a Mn scavenger and an HF scavenger.

The porous substrate used in the present invention may be a membrane or non-woven fabric form. The porous substrate may be made of a polyolefin-based polymer, but is not limited thereto. The polyolefin-based polymer is preferably selected from polyethylene, polypropylene, polybutylene and polypentene.

Also, the first and the second inorganic particles used in the present invention may be selected from inorganic particles having a dielectric constant of 5 or higher, inorganic particles having the ability to transport lithium ions, and a mixture thereof.

Examples of the inorganic particles having a dielectric constant of 5 or higher include $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$ inorganic particles and a mixture thereof.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

Examples of the binder polymer used in the present invention include polyvinylidene fluoride-co-hexafluoropropylene, polyvinylidene fluoride-co-trichloroethylene, polymethyl methacrylate, polybuthyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and a mixture thereof.

The weight ratio of a mixture of the first inorganic particles and the second first inorganic particles:the binder polymer preferably ranges from 80:20 to 90:10.

The coupling agent used in the present invention may be a silane-based coupling agent.

The separator of the present invention may be used in an electrochemical device comprising a cathode, an anode and a separator interposed between the cathode and the anode, particularly a lithium secondary battery.

The separator of the present invention is manufactured by preparing first inorganic particles having an average diameter of 1 to 10 μm and coated with a coupling agent, and second inorganic particles having an average diameter of 50 to 500 nm and coated with a coupling agent on the surface thereof; mixing the first inorganic particles and the second inorganic particles together with a binder polymer and adding the resulting mixture to a solvent to obtain a slurry; and coating the slurry on at least one surface of a porous substrate.

The slurry may further comprise functional particles.

Advantageous Effects

In accordance with the present invention, a separator having a porous coating layer comprising two kinds of inorganic particles which are coated with a coupling agent is manufactured to minimize a mechanochemical reaction, thereby inhibiting the production of unnecessary substances. Such a minimization of the mechanochemical reaction can make it easy to introduce functional particles capable of controlling resultants obtained from a side reaction of an electrochemical device, and to maintain the activity of the functional particles.

Therefore, the separator of the present invention has superior thermal stability and can prevent the performance degradation of an electrochemical device.

BEST MODE

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

The separator of the present invention has a porous substrate; and a porous coating layer formed on at least one surface of the porous substrate and comprising a mixture of first inorganic particles coated with a coupling agent on the surface thereof, second inorganic particles coated with a coupling agent on the surface thereof and a binder polymer, the first inorganic particles having an average diameter of 1 to 10 μm and the second inorganic particles having an average diameter of 50 to 500 nm. The porous coating layer may further comprise functional particles.

The inorganic particles used in the present invention are hydrophilic and thus require a surface coating treatment with a coupling agent before being introduced in an organic solvent. The inorganic particles coated with a coupling agent on the surface thereof may be uniformly dispersed in an organic solvent. In the present invention, two kinds of inorganic particles having different average diameters are used. Specifically, the first inorganic particles having an average diameter of 1 to 10 μm and the second inorganic particles having an average diameter of 50 to 500 nm are used. The inorganic particles are coated with the coupling agent on the surface thereof, so the binder polymer adsorbed on the surface of the inorganic particles is present between the inorganic particles to induce a depletion effect which affects the approach of the particles, thereby uniformly dispersing the inorganic particles in an organic solvent without agglomeration. Through such a uniform dispersion, the second inorganic particles having a relatively small size are present between the first inorganic particles having a relatively large size, to function as a binder to assist the contact between the first inorganic particles having a large size. Accordingly, the porous coating layer of the present invention may allow the binder polymer to be used in a small amount, thereby minimizing a side reaction such as electrical resistance increase due to the use of the binder polymer. In the present invention, the weight ratio of the first inorganic particles:the second first inorganic particles preferably ranges from 50:50 to 90:10. When the content of the first inorganic particles is less than 50 wt %, the pores of the porous coating layer become relatively small and are closely packed to reduce the air permeability of the porous coating layer. When the content of the second inorganic particles is less than 10 wt %, the depletion effect occurs insufficiently such that the second inorganic particles do not satisfy the function as a binder, even though the air permeability is good. The inorganic particles of the porous coating layer according to the present invention are present in a closest packed structure which allows substantial contact with each other, from which interstitial volumes are formed to provide pores.

In the present invention, the mixture of the first inorganic particles and the second inorganic particles is well dispersed due to the depletion effect and the mixing thereof is easy such that a milling process may not be required. The milling process refers to a high energy mixing process and pulverizes the inorganic particles, in which a mechanochemical reaction occur due to the reaction of the pulverized inorganic particles with air or other raw materials. The mechanochemical reaction may result in the production of unnecessary substances. Therefore, when functional particles are introduced to control by-products formed from a side reaction of an electrochemical device, an additional mechanochemical reaction should be contemplated together with the affect of separator properties thereby. In accordance with the present invention, since a milling process is not necessary, such a mechanochemical reaction can be minimized, which makes it easy to introduce the functional particles for controlling by-products formed from a side reaction of an electrochemical device. Examples of the functional particles may include a water scavenger, a Mn scavenger and an HF scavenger. Particularly, when a water scavenger is introduced, there is a possibility that its activity may reduce by absorbing the water exposed by the mechanochemical reaction. However, since the present invention can prevent the mechanochemical reaction, the activity of a water scavenger will not be reduced.

The water scavenger may include one made of a super absorbent polymer, the Mn scavenger may include zeolite, and the HF scavenger may include $CaCO_3$, $(Al(OH)_3)$, $ZnO$ and $LiCO_3$.

The porous substrate used in the present invention may be a membrane or non-woven fabric form. The porous substrate may be made of a polyolefin-based polymer, but is not limited thereto. The polyolefin-based polymer is preferably selected from polyethylene, polypropylene, polybutylene and polypentene.

In the separator of the present invention, any one having electrochemical stability may be used as the first and the second inorganic particles without limitation. That is, the inorganic particles which may be used in the present invention are not particularly limited if an oxidation-reduction reaction does not occur in an operating voltage range (for example, 0 to 5 V based on $Li/Li^+$) of an applied electrochemical device. Particularly, inorganic particles having the ability to transport lithium ions may be used to increase an ionic conductivity in an electrochemical device, thereby promoting the performance improvement thereof.

Also, inorganic particles having a high dielectric constant may be used to increase a dissociation rate of an electrolyte salt in a liquid electrolyte, thereby improving an ionic conductivity of the electrolyte.

Accordingly, the inorganic particles used in the present invention preferably include inorganic particles having a dielectric constant of 5 or higher, preferably 10 or higher, inorganic particles having the ability to transport lithium ions, or a mixture thereof.

Non-limiting examples of the inorganic particles having a dielectric constant of 5 or higher include $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$ inorganic particles and a mixture thereof.

Among these, inorganic particles such as $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$) and hafnia ($HfO_2$) exhibit a high dielectric characteristic of a dielectric constant of 100 or higher, and piezoelectricity that constant pressure is applied to induce a potential difference between both surfaces, thereby preventing generation of an internal electrical short of both electrodes caused by external impact and thus further improving the safety of an electrochemical device.

In the present invention, the inorganic particle having lithium ion transferring capability refers to an inorganic particle containing lithium atom and capable of moving a lithium ion without storing the lithium. The inorganic particle having lithium ion transferring capability may transfer and move lithium ions due to a kind of defect existing in the particle structure, so it is possible to improve lithium ion conductivity in the battery and also improve the performance of the battery. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, and a mixture thereof.

The weight ratio of a mixture of the first inorganic particles and the second first inorganic particles:the binder polymer preferably ranges from 80:20 to 90:10. In the porous coating layer, the second inorganic particles coated with the coupling agent can function as a binder to provide good mechanical properties in the use of a small amount of the binder polymer.

The coupling agent which may be used in the present invention includes a silane-based coupling agent, for example, octadecyltrimethoxy silane, vinyltrimethoxy silane and 3-glycidoxy propyltrimethoxy silane.

The separator of the present invention may be manufactured as follows.

First, first inorganic particles having an average diameter of 1 to 10 μm and coated with a coupling agent, and second inorganic particles having an average diameter of 50 to 500 nm and coated with a coupling agent on the surface thereof are prepared, respectively.

Specifically, the first inorganic particles having an average diameter of 1 to 10 μm and the second inorganic particles having an average diameter of 50 to 500 nm are prepared and surface-modified with a reducing agent such as an ammonia solution such that hydrophilic groups are easily attached to the particles. Then, the surface-modified inorganic particles are coated with a coupling agent on the surface thereof.

Next, the first inorganic particles and the second inorganic particles are mixed together with a binder polymer and the resulting mixture is added to a solvent to obtain a slurry.

Also, the slurry, in which the organic particles are dispersed in the solvent and the binder polymer is dissolved in the solvent, may be obtained by dissolving the binder polymer in a solvent and dispersing the first inorganic particles and the second inorganic particles prepared, and if necessary, additional functional particles therein. The dispersion method is not particularly limited except for a high energy milling process, for example, the dispersion may be conducted by using a mixer.

The solvent for dissolving the binder polymer preferably has a solubility parameter similar to that of the binder polymer and a low boiling point, so as to achieve uniform mixture and easy removal of the solvent afterward. Non-limiting examples of the solvent which may be used in the present invention include acetone, tetrahydrofuran, methylene chloride, chloroform, dimethylformamide, N-methyl-2-pyrrolidone (NMP), cyclohexane, water, and a mixture thereof.

The slurry may further comprise functional particles such as a water scavenger, a Mn scavenger and an HF scavenger.

After that, the slurry is coated on at least one surface of a porous substrate.

The coating of the slurry may be conducted by using common coating methods well known in the art. For example, various methods such as dip coating, die coating, roll coating, comma coating and a combination thereof may be used.

After coating the slurry on the porous substrate, a post-treatment process such as a dry procedure may be optionally conducted.

The separator manufactured according to the present invention may be used as a separator of an electrochemical device, which is interposed between cathode and anode electrodes.

The electrochemical device of the present invention may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The separator of the present invention may be used together with any electrode which is not particularly limited, and the electrode may be manufactured by binding an electrode active material to an electrode current collector according to one of common methods well known in the art. A cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof. An anode active material may be any of those that are commonly used in anodes of conventional electrochemical devices. Non-limiting examples of the anode active material include lithium, lithium alloys, and lithium intercalation materials such as carbon, petroleum coke, activated carbon, graphite and other carbonaceous materials. Non-limiting examples of a cathode current collector suitable for use in the electrochemical device of the present invention include aluminum foils, nickel foils and a combination thereof. Non-limiting examples of an anode current collector suitable for use in the electrochemical device of the present invention include copper foils, gold foils, nickel foils, copper alloy foils and a combination thereof.

The electrochemical device of the present invention can use an electrolyte consisting of a salt and an organic solvent capable of dissolving or dissociating the salt. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof.

The electrolyte may be injected in any suitable step during the manufacturing of the electrochemical device depending on the manufacturing processes and desired physical properties of a final product. Specifically, the electrolyte may be injected before battery assembly or in the final step of battery assembly.

The electrochemical device of the present invention is generally manufactured by winding the separator and the electrodes. Lamination (or stacking) and folding of the separator and the electrodes are also possible.

The separator of the present invention may be interposed between the cathode and the anode of a secondary battery, and in case that a plurality of cells or electrodes are stacked to compose an electrode assembly, may be interposed between the adjacent cells or electrodes. The electrode assembly may have various forms such as simple stack, jelly-roll and stack-folding types.

In accordance with one embodiment of the present invention, the electrode assembly may be manufactured by interposing the separator of the present invention between a cathode and an anode which are coated with each of active materials, followed by sequentially winding the cathode/separator/anode. Alternatively, the electrode assembly may be manufactured by bending the cathode/separator/anode to have a constant distance, which results in an overlapped structure of a zigzag-type. Meanwhile, the winding or bending electrode assemble may comprise a plurality of electrodes and separators which are alternatively laminated, so as to provide an increased capacity.

In accordance with another embodiment of the present invention, the electrode assembly may be manufactured by laminating the cathode/separator/anode or the anode/separator/cathode as a repeating unit, wherein the separator of the present invention is used as a separator.

In accordance with still another embodiment of the present invention, the electrode assembly may be manufactured by stacking a plurality of unit cells having a full-cell or bi-cell structure with a folding film. As the folding film, conventional insulator films or the separator of the present invention may be used. The full-cell structure means a cell structure which comprises at least one cell having a separator interposed between electrodes having different polarities, wherein the outermost electrodes have different polarities. Examples of the full-cell structure may include cathode/separator/anode and cathode/separator/anode/separator/cathode/separator structures. The bi-cell structure means a cell structure which comprises at least one cell having a separator interposed between electrodes having different polarities, wherein the outermost electrodes have the same polarity. Examples of the bi-cell structure may include a cathode/separator/anode/separator/cathode and anode/separator/cathode/separator/anode structure.

The stacking of unit cells using the folding film may be conducted in various manners. For example, a plurality of unit cells are arranged at a prescribed interval on one surface of the folding film extended in a longitudinal direction, and the arranged unit cells and the folding film are wound in one direction to manufacture an electrode assembly. The electrode assembly thus manufactured has a structure in which the unit cells are inserted between the wound folding film. As the other example, a plurality of unit cells are arranged at a prescribed interval on both surfaces of the folding film extended in a longitudinal direction, and the arranged unit cells and the folding film are wound in one direction to manufacture an electrode assembly. The electrode assembly thus manufactured has a structure in which the unit cells are inserted between the wound folding film. The arrangement intervals of the unit cells and the polarity of the outermost electrodes in each unit cell are selected so that the electrodes of the top cell and the bottom cell which are in contact with the folding film have different polarities. For example, the arrangement intervals of the unit cells and the polarity of the outermost electrodes in each unit cell may be selected to form an electrode assembly such as a cathode/separator/anode/folding film/cathode/separator/anode/folding film/cathode structure.

As another example, a plurality of unit cells are arranged at a prescribed interval on one surface of the folding film extended in a longitudinal direction, and the arranged unit cells and the folding film are bended in a zigzag form to manufacture an electrode assembly in which the unit cells are arranged between the bended folding film. The electrode assembly thus manufactured has a structure in which the unit cells are inserted between the bended and laminated folding film. As still another example, a plurality of unit cells are arranged at a prescribed interval on both surfaces of the folding film extended in a longitudinal direction, and the arranged unit cells and the folding film are bended in a zigzag form to manufacture an electrode assembly in which the unit cells are arranged between the bended folding film. The electrode assembly thus manufactured has a structure in which the unit cells are inserted between the bended and laminated folding film. The arrangement intervals of the unit cells and the polarity of the outermost electrodes in each unit cell are selected so that the electrodes of the top cell and the bottom cell which are in contact with the folding film have different polarities. For example, the arrangement intervals of the unit cells and the polarity of the outermost electrodes in each unit cell may be selected to form an electrode assembly such as a cathode/separator/anode/folding film/cathode/separator/anode/folding film/cathode structure.

The stacking of the electrodes using the folding film may be conducted in various manners. For example, a cathode and an anode may be arranged in turn on one surface of the folding film, and the arranged electrodes and the folding film are wound in one direction to manufacture an electrode assembly. The electrode assembly thus manufactured has a structure in which the electrodes are inserted between the wound folding film. As the other example, a plurality of electrodes are arranged at a prescribed interval on both surfaces of the folding film extended in a longitudinal direction, and the arranged electrodes and the folding film are wound in one direction to manufacture an electrode assembly. The electrode assembly thus manufactured has a structure in which the electrodes are inserted between the wound folding film. The arrangement intervals of the electrodes and the polarity thereof are selected so that the top and the bottom electrodes which are in contact with the folding film have different polarities. For example, the arrangement intervals of the electrodes and the polarity of each electrode may be selected to form an electrode assembly such as a cathode/folding film/anode/folding film/cathode structure.

As another example, a cathode and an anode may be arranged in turn on one surface of the folding film, and the arranged electrodes and the folding film are bended in one direction to manufacture an electrode assembly in which the electrodes are arranged between the bended folding film. The electrode assembly thus manufactured has a structure in which the electrodes are inserted between the bended and laminated folding film. As still another example, a plurality of electrodes are arranged at a prescribed interval on both surfaces of the folding film extended in a longitudinal direction, and the arranged electrodes and the folding film are bended to manufacture an electrode assembly in which the electrodes are arranged between the bended folding film. The electrode assembly thus manufactured has a structure in which the electrodes are inserted between the bended and laminated folding film. The arrangement intervals of the electrodes and the polarity thereof are selected so that the top and the bottom electrodes which are in contact with the folding film have different polarities. For example, the arrangement intervals of the electrodes and the polarity of each electrode may be selected to form an electrode assembly such as a cathode/folding film/anode/folding film/cathode structure.

Meanwhile, the length of the folding film used for manufacturing an electrode assembly may be selected to allow at least one winding for the electrode assembly after the last unit cell or electrode is stacked as mentioned above. However, the electrode assembly may be taken in various other forms, and its form is not particularly limited in the present invention.

MODE FOR INVENTION

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

EXAMPLE

Example 1

Manufacture of Separator Having Porous Coating Layer Comprising First Inorganic Particles and Second Inorganic Particles Coated with Coupling Agent 80 parts by weight of first inorganic particles having an average diameter of 1 μm and 20 parts by weight of second inorganic particles having an average diameter of 100 nm were prepared.

The first inorganic particles were dispersed in an ethanol solvent to obtain a mixture, and the mixture was treated with an ammonia solution to reduce the surface of the first inorganic particles. Then, octadecyltrimethoxy silane as a hydrophobic coupling agent was added to the mixture and reacted for 2 hours. The first inorganic particles coated with the coupling agent were colleted by centrifuge, washed and dried.

Similarly, the second inorganic particles coated with the coupling agent were obtained by the same procedures as the first inorganic particles.

The first inorganic particles and the inorganic particles prepared were dispersed in an acetone solution, to which CTFE-HEP (18 wt %) and cyanoresin (1.5 wt %) as a binder polymer were added, followed by stirring with a magnetic stirrer for 30 minutes, to obtain a slurry wherein the weight ratio of the first inorganic particles and second inorganic particles:the binder polymer is 8:2.

The slurry obtained was coated on a membrane to obtain a separator having a porous coating layer.

Example 2

Manufacture of Separator Having Porous Coating Layer Comprising First Inorganic Particles and Second Inorganic Particles Coated with Coupling Agent and Water Scavenger The procedures of Example 1 were repeated in addition to a further step of adding a water scavenger.

As the water scavenger, an acryl-based superabsorbent polymer was pulverized in a size of 1 to 5 μm and was dispersed in an acetone solution together with the first inorganic particles and the second inorganic particles prepared, to which CTFE-HEP (18 wt %) and cyanoresin (1.5 wt %) as a binder polymer were added, followed by stirring with a magnetic stirrer for 30 minutes, to obtain a slurry.

The slurry obtained was coated on a membrane to obtain a separator having a porous coating layer.

Comparative Example 1

Manufacture of Separator Having Porous Coating Layer Comprising First Inorganic Particles and Second Inorganic Particles 80 parts by weight of first inorganic particles having an average diameter of 1 μm and 20 parts by weight of second inorganic particles having an average diameter of 100 nm were prepared.

The first inorganic particles and the inorganic particles prepared were dispersed in an acetone solution, to which CTFE-HEP (18 wt %) and cyanoresin (1.5 wt %) as a binder polymer were added, followed by stirring by means of a ball-mill method for 30 minutes, to obtain a slurry wherein the weight ratio of the first inorganic particles and second inorganic particles:the binder polymer is 8:2.

The slurry obtained was coated on a separation membrane to obtain a separator having a porous coating layer.

Comparative Example 2

Manufacture of Separator Having Porous Coating Layer Comprising First Inorganic Particles, Second Inorganic Particles and Water Scavenger The procedures of Comparative Example 1 were repeated in addition to a further step of adding a water scavenger.

As the water scavenger, an acryl-based superabsorbent polymer was pulverized in a size of 1 to 5 μm and was dispersed in an acetone solution together with the first inorganic particles and the second inorganic particles prepared, to which CTFE-HEP (18 wt %) and cyanoresin (1.5 wt %) as a binder polymer were added, followed by stirring by means of a ball-mill method for 30 minutes, to obtain a slurry.

The slurry obtained was coated on a separation membrane to obtain a separator having a porous coating layer.

Test Example 1

Evaluation of Air Permeability

The separators obtained in Examples 1 and 2 and Comparative Examples 1 and 2 were measured for air permeability. The results are shown in Table 1.

TABLE 1

|  | Example 1 | Example 2 | Com. Example 1 | Com. Example 2 |
|---|---|---|---|---|
| Air permeability (sec/100 cc) | 530 | 530 | 1580 | 1800 |

The separators obtained in Examples 1 and 2 have relatively good air permeability compared to the separators obtained in Comparative Examples 1 and 2.

In particular, the air permeability obtained in Example 2 is equivalent to that in Example 1, whereas the air permeability obtained in Comparative Example 2 is different from that in Comparative Example 1 by 220. Such a difference may be expected to result from the deformation of the superabsorbent polymer due to the milling process, thereby reducing the air permeability of a separator. In contrast, the separator of Example 2 is obtained by dispersion due to simple mixing without the use of the superabsorbent polymer, and thus expected to maintain air permeability.

INDUSTRIAL APPLICABILITY

The present invention has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A separator, comprising:
a porous substrate; and
a porous coating layer formed on at least one surface of the porous substrate and comprising a mixture of first inorganic particles coated with a coupling agent on the surface thereof, second inorganic particles coated with a coupling agent on the surface thereof and a binder polymer, the first inorganic particles having an average diameter of 1 to 10 μm and the second inorganic particles having an average diameter of 50 to 500 nm,
wherein a weight ratio of the first inorganic particles:the second inorganic particles ranges from 50:50 to 90:10.

2. The separator according to claim 1, wherein the porous coating layer further comprises functional particles.

3. The separator according to claim 2, wherein the functional particles are selected from a water scavenger, a Mn scavenger, an HF scavenger and a mixture thereof.

4. The separator according to claim 1, wherein the porous substrate is made of a polyolefin-based polymer.

5. The separator according to claim 1, wherein the porous substrate is made of a polyolefin-based polymer selected from the group consisting of polyethylene, polypropylene, polybutylene and polypentene.

6. The separator according to claim 1, wherein the first and the second inorganic particles are each independently selected from the group consisting of inorganic particles having a dielectric constant of 5 or higher, inorganic particles having the ability to transport lithium ions, and a mixture thereof.

7. The separator according to claim 6, wherein the inorganic particles having a dielectric constant of 5 or higher are selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$ inorganic particles and a mixture thereof.

8. The separator according to claim 6, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride (LixNy, $0<x<4$, $0<y<2$), SiS2 type glass (LixSiySz, $0<x<3$, $0<y<2$, $0<z<4$), P2S5 type glass (LixPySz, $0<x<3$, $0<y<3$, $0<z<7$) particles, and a mixture thereof.

9. The separator according to claim 1, wherein the binder polymer is selected from the group consisting of polyvinylidene fluoride-co-hexafluoropropylene, polyvinylidene fluoride-co-trichloroethylene, polymethyl methacrylate, polybuthyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and a mixture thereof.

10. The separator according to claim 1, wherein a weight ratio of a mixture of the first inorganic particles and the second inorganic particles:the binder polymer ranges from 80:20 to 90:10.

11. The separator according to claim 1, wherein the coupling agent coated on each surface of the first inorganic particles and the second inorganic particles is a silane-based coupling agent.

12. An electrochemical device, comprising a cathode, an anode and a separator interposed between the cathode and the anode,
wherein the separator is a separator according to claim 1.

13. The electrochemical device according to claim 12, which is a lithium secondary battery.

\* \* \* \* \*